Oct. 28, 1952     W. C. McDONALD     2,616,068
APPARATUS FOR GAUGING THICKNESS

Filed June 2, 1948                                     2 SHEETS—SHEET 1

INVENTOR
WILLIAM C. McDONALD

BY *Parham & Bates*
ATTORNEYS

Oct. 28, 1952 W. C. McDONALD 2,616,068
APPARATUS FOR GAUGING THICKNESS
Filed June 2, 1948 2 SHEETS—SHEET 2
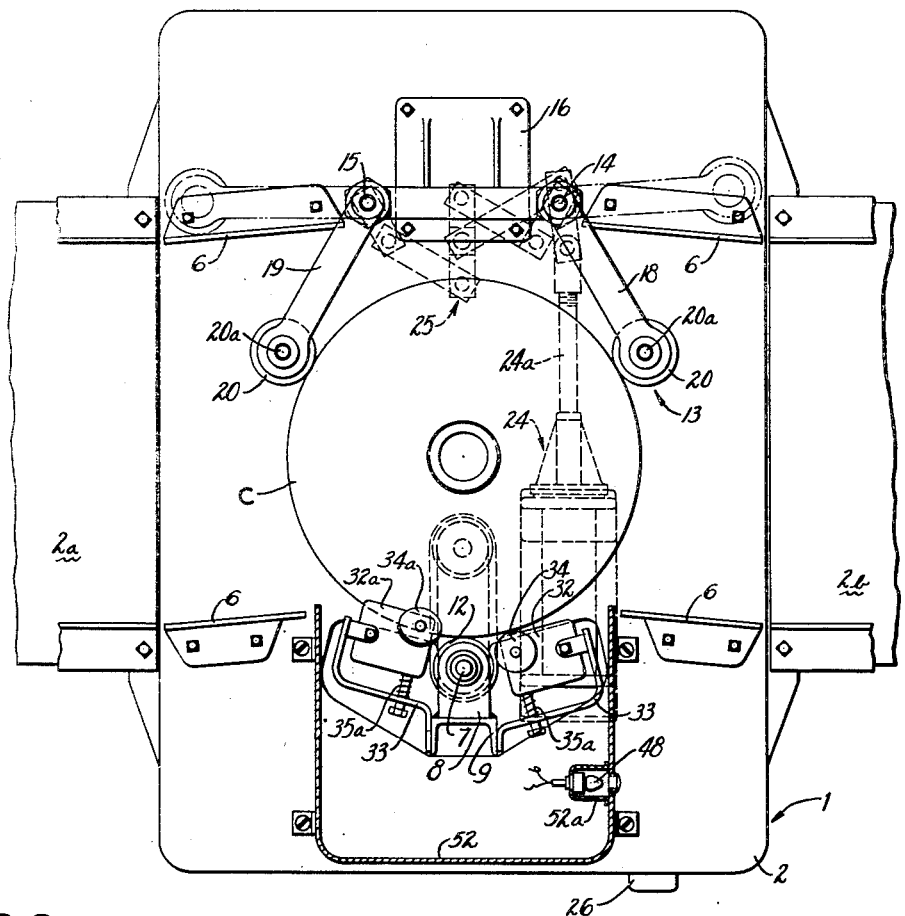

Patented Oct. 28, 1952

2,616,068

UNITED STATES PATENT OFFICE 2,616,068

APPARATUS FOR GAUGING THICKNESS

William C. McDonald, Hartford, Conn., assignor to Emhart Manufacturing Company, a corporation of Delaware Application June 2, 1948, Serial No. 30,645

1 Claim. (Cl. 318—452)

The present invention relates to apparatus for electrically measuring thickness of walls which are formed of a dielectric material, particularly walls of narrow neck containers and the like, where one wall surface is inaccessible or difficult of access. The difficulty in checking or measuring the wall thickness of glass bottles and carboys, the inside surface of which cannot be reached readily, is apparent.

Heretofore, various methods have been suggested for checking thickness of dielectric walls having inaccessible surfaces. One such method consists in observing the change in mutual electrostatic capacity which is created by placing one surface of a wall of dielectric material in contact with or at a controlled distance from two electrodes or capacitors. When the dielectric material is placed in the checking position, the mutual electrostatic capacity of the two electrodes is increased by the presence of the dielectric material. By measuring the mutual capacity, an indication of the thickness of the material is obtained.

However, a two electrode system has the disadvantage of requiring a compromise in the location of the electrodes. If the electrodes are placed too close together in comparison with the average thickness of the wall to be measured, then the capacity will change by only a very small percentage when the thickness of the wall is varied. On the other hand, if the electrodes are too far apart, the total capacity will depend upon the average thickness over a considerable area and not be sensitive to variations within that area.

The present invention provides gauging apparatus which is sensitive to thickness changes in small areas and which reduces the dependence of capacitance on the electrode to dielectric distance thereby reducing the compromise between sensitivity and effective area.

An object of the invention is to measure or indicate thickness, or variations in thickness, in response to variations in the capacitance of a single detector electrode and the portion of an adjacent dielectric wall.

Another object is to provide improved gauging apparatus containing a plurality of such single detector electrodes for gauging a like number of wall portions simultaneously.

A further object is the provision of a single electrode measuring device including an electrical system which is extremely sensitive to very slight changes in thickness within a critical range and is adaptable to high speed automatic inspection.

Further objects of the invention will become apparent from the following description made with reference to the accompanying drawing in which:

Figure 1 is a side elevational view of apparatus, embodying the present invention, parts of which are broken away to show the arrangement of detector elements for checking variations in the wall thickness of carboys or the like;

Fig. 2 is a top plan view of the apparatus shown in Fig. 1 with the casing broken away and including certain structural details not shown in Fig. 1; and Fig. 3 is a wiring diagram of the measuring circuit utilized in the apparatus shown in Figs. 1 and 2.

Figure 1:
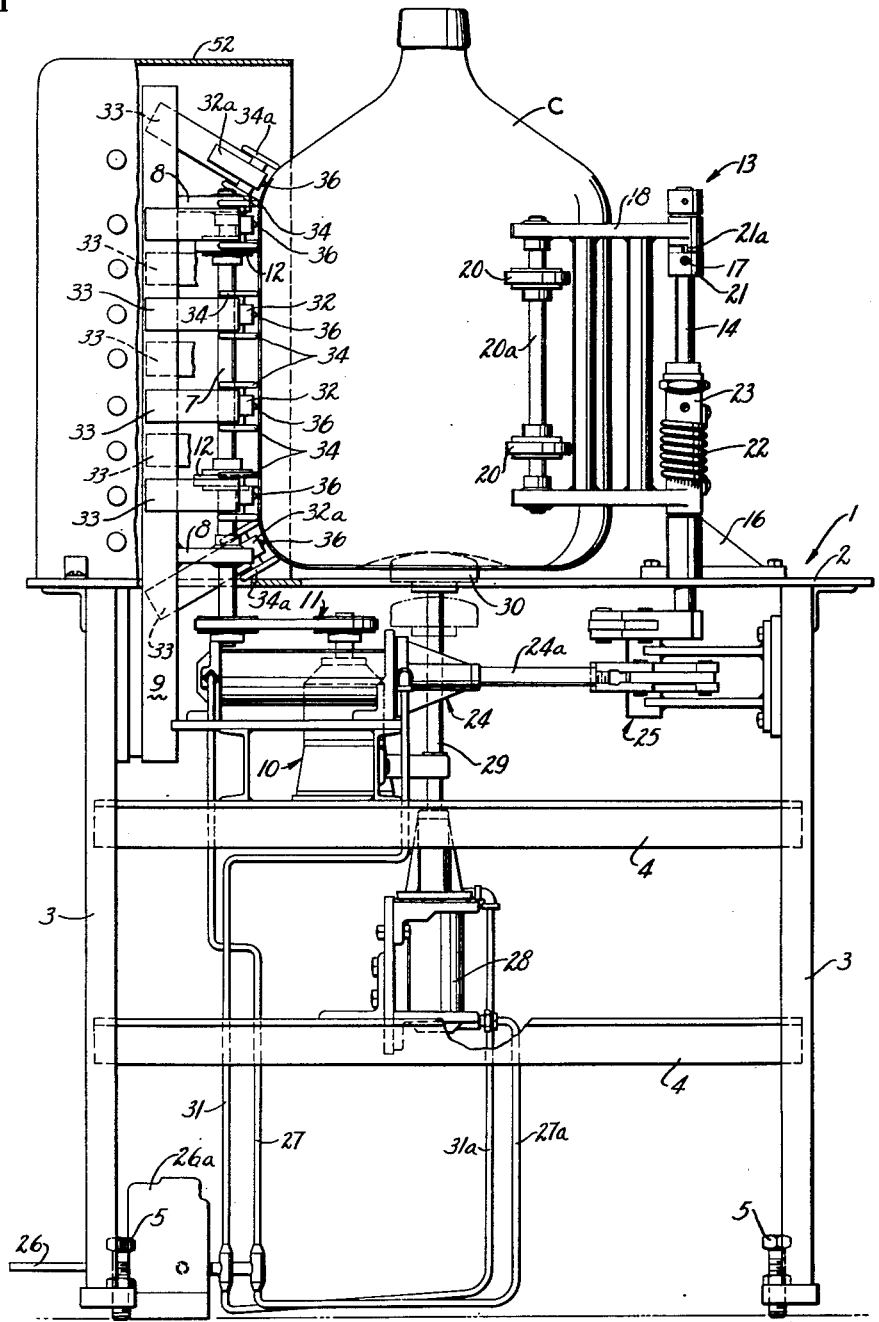

Generally, the invention consists in novel method and apparatus for determining the thickness, or variations in the thickness, of a wall of dielectric material by observing the effect of the wall upon the electrostatic capacitance of a single electrode when portions of an accessible surface of the wall are successively brought to the same predetermined position relative to the electrode.

The embodiment of the invention illustrated in Figs. 1 and 2 comprises apparatus for testing the walls of large glass carboys for thin spots. In order to more quickly check each carboy a plurality of electrodes are provided. However, each electrode has its own gauging circuit (Fig. 3) and each such circuit is responsive to changes in the capacitance of its electrode and the contiguous portion of the carboy, independently of the other electrodes and portions of the carboy contiguous thereto. The apparatus thus is adapted to check the thickness of a plurality of wall portions simultaneously.

Referring more particularly to the mechanical components of the apparatus shown in Figs. 1 and 2, there is provided a frame generally designated by the numeral 1, including a horizontal work table 2 supported by vertical legs 3 and suitably braced as by cross-members 4. Jack screws 5 are located at the bottom of each leg 3 to provide for leveling the table 2.

As shown in Fig 2, extension plates 2a and 2b are attached to the table 2 and provide additional working surfaces upon which to place the carboys or other articles prior to and following an inspection of each above the table 2. Preferably, the plates 2a and 2b are either hinged or removably secured to the work table 2 so as not to encumber the spaces about the apparatus when not in use.

Suitable guide members, as for example, the brackets 6, may be provided for guiding the movement of each carboy C from the plate 2a to the gauge table 2 and thence to the receiving plate 2b. It will be understood that in commercial use the carboys may be continuously supplied to the receiving table or plate 2a as by means of a belt conveyor and a similar conveyor may be provided for removing the inspected carboys from the table extension 2b.

As illustrated in the drawings, means are provided for supporting the carboy in its vertical position and for rotating it about its vertical axis.

Rotation is effected through a vertical shaft 7 which is rotatably journaled in conventional manner, as in bracket members 8 which project horizontally from a vertical frame member 9. A motor and speed control assembly, generally designated 10, provides means for rotating the shaft 7 at any desired speed through a pulley and belt drive assembly, generally designated 11. Secured to the shaft 7 are a pair of rubber driving rollers 12 of like diameter which are adapted to frictionally engage and rotate the carboy C about its vertical axis.

Proper engagement of the carboy with the rollers 12 is maintained by a clamping mechanism generally designated 13. As illustrated in the drawings, the clamping mechanism 13 includes a pair of parallel shafts 14 and 15, each of which extends through and is rotatably journaled in a bearing bracket 16 fastened to the table 2. Pivotally mounted on the respective shafts 14 and 15, are lever arm assemblies 18 and 19, each of which rotatably supports, at its outer or free end, a vertical shaft 20a to which is secured a pair of spaced rollers 20, 20. The rollers 20 are adapted to rotatably engage the side wall of the carboy C at vertically spaced points adjacent the chine and the shoulder and at peripherally spaced points approximately equi-distant from each other and from the rollers 12.

Secured to shaft 14, as by a pin 17, is a clutch member 21 which engages and pivots lever assembly 18 when rod 14 is rotated about its axis. The connection between the clutch 21 and lever 18 includes a lost motion drive 21a which permits a small amount of relative rotational movement between the rod 14 and lever 18, as for example, 8 degrees. The lever 18, as viewed in Fig. 2, is resiliently held at the clockwise limit of rotation permitted by a lost motion connection which, in the embodiment illustrated, includes a torsional spring 22 secured at its ends to the lever 18 and to a sleeve 23, pinned or otherwise fastened to shaft 14.

A similar lost motion torsion spring connection is provided between lever 19 and shaft 15, save that the lever 19, as viewed in Fig. 2, is resiliently urged in a counter-clockwise direction. Preferably, the torsion springs 22 have sufficient strength so that rotation of the shafts 14 and 15 effects the movement of the levers 18 and 19 to the positions shown in Fig. 2 through the springs 22 and the carboy C is pushed by the rollers 20 into and held in engagement with the rollers 12 without establishing a positive or direct engagement of the roller supporting levers 18 and 19 with their clutches 21.

It will be apparent that one of a variety of drives may be utilized to pivot to and hold the roller supporting levers 18 and 19 in their carboy engaging positions (shown in full in Fig. 2), and to their inoperative positions (shown in phantom) where they are out of the path defined by the brackets 6 for guiding the movement of the carboy to and from the working table 2.

In the embodiment illustrated, the necessary rotation of each shaft 14 and 15 is effected by a hydraulic system including a double acting piston motor, generally designated 24, and connecting linkage, generally designated 25. Pressure on a foot pedal 26 operates valves within a housing 26a which supply air pressure through a line 27 to the motor 24 whereupon the motor piston rod 24a is forced to the right (Fig. 1) and the levers 18 and 19 pivoted to their operative positions.

At the same time, the branch 27a of line 27 supplies fluid pressure to a hydraulic motor 28 which axially raises a rotatably journaled vertical spindle 29. Secured to the upper end of the spindle 29 is a member 30 which is adapted to lift and rotatably support the carboy at a predetermined elevation above the table 2.

The operation of the foot pedal 26 also serves to start the motor 10, as by closing a control switch T' of an automatic timer T (Fig. 3), both of which may be located within the housing 26a. The timer T delays the starting of the motor 10 and the rotation of the carboy C through the driving rollers 12 for the period of time necessary for the rollers 20 to center and the spindle 29 to raise the carboy to the position shown in Fig. 1.

In the embodiment of the invention illustrated, it is contemplated that the timer T will permit rotation of the carboy through a predetermined cycle, as for example, one and a quarter revolutions. Upon completion of the cycle, provided the latter is not sooner interrupted by operation of the gauging apparatus hereinafter described, the circuit through the timer T is broken, thereby stopping the motor 10. Thereafter, fluid pressure may be supplied through lines 31 and 31a to motors 24 and 28 which, respectively, withdraw the rollers 20 to their inoperative positions and lower the spindle 29 thereby depositing the carboy C on the table 2. The retraction of the motors may be effected by releasing the pedal 26.

As the carboy rotates, the gauging is effected by a number of generally identical detector elements, each of which is located in its individual housing 32. In the embodiment illustrated, seven such identical housings 32 are staggered at equally spaced elevations above one another in two vertical columns which are located on opposite sides and adjacent to the roller shaft 7. Each housing 32 is pivotally supported by means of a bracket 33 secured to the vertical post 9 and is provided with a pair of electrically insulated rollers 34 which are rotatably secured to the aluminum housing and resiliently pressed into rotatable engagement with the periphery of the carboy as by means of compression springs. As illustrated in Figs. 1 and 2, substantially identical housings 32a are angularly disposed relative to the other detecting elements 32 and rotatably carry somewhat larger rollers 34a which are resiliently pressed by springs 35a into rolling engagement with the shoulder and chine of the carboy.

The housings 32 and 32a each contain an electrode 36, which is located by the engagement of the housing roller 34 and 34a at a predetermined distance from the carboy C. The electrodes 36 may be circular conducting buttons suitably insulated from their housing 32 or 32a and equally spaced from the carboy. The capacity of each electrode is small, preferably of the order of magnitude of three micro-microfarads.

The manner in which each electrode 36 gauges thickness is the same so that the following description of the apparatus associated with one electrode will suffice for all.

As shown in Fig. 3, the electrode 36 is connected through a fixed blocking condenser 37 having a capacity of the order of 100 micro-microfarads or greater; to one terminal 38a of a plate tuning variable condenser 38 of the order of four micro-microfarads; to one terminal 39a of an inductance coil 39 having 9 turns of No. 18 enameled copper wire space-wound about a ¾ inch diameter core; and to plate 40a of a triode oscillator tube 40. Terminal 38b of condenser 38 and terminal 39b of coil 39 are grounded through a by-pass blocking condenser 41 of the order of 1000 micro-microfarads, or greater, and also are connected to the positive terminal 42 of a 75 volt source through a 2½ μh. radio-frequency choke 43 and through a relay coil 44. Terminal 42a of the battery is grounded.

Grid 40b of the tube 40 is connected to a feedback coil 45 having three turns of wire close-wound on the same core and in the same direction as the coil 39. As shown in Fig. 3, the feedback coil 45 is connected to a piezo-electric crystal element 46 and to a grounded grid bias resistor 47 arranged in parallel.

The crystal unit 46 may have a frequency of the order of 28 megacycles and should have a temperature coefficient that permits it to stay within the required frequency limits over the range of temperature at which it is expected to operate. The bias resistor 47 may be of the order of 30,000 ohms, ½ watt.

The feedback coil 45 makes the crystal oscillator circuit regenerative thus reducing the time lag between changes in capacitance and corresponding changes in plate current. The circuit is extremely sensitive and quickly registers any change in the plate current of the oscillator circuit such as is created by a change in capacitance of the detector element 36.

As long as the plate current remains above the predetermined minimum, a movable contact bar 50 of a suitable switch is held by the relay coil 44 in the position shown in Fig. 3 where it connects the associated pair of stationary contacts 49a and 49b and completes a circuit from a 110 volt power source through the timer T and the motor 10. However, when the plate current falls below the predetermined minimum, the coil 44 releases the contact bar 50 which thereupon moves to connect contacts 51a and 51b and completes a circuit from the 110 volt power source through the timer T and a bulb 48. At the same time, the connection between the contact 49a and 49b is broken and the supply of current to the motor 10 is interrupted.

It will be understood that the components of the circuit illustrated in Fig. 3 are duplicated for each detector element 36 with the exception of the motor 10, timer T and timer control switch T' which are common to each circuit. Preferably, the light bulbs 48 of the several circuits are arranged in parallel between the timer T and the terminal 51a of their individual relay control switches while the several switch contacts 49a and 49b are arranged in series. This arrangement provides for interruption of the current to the motor 10 whenever the current flowing in any one of the several relay coils 44 falls below the predetermined minimum, and, at the same time, provides for the lighting of only the particular bulb 48 associated with the relay coil through which the sub-minimum current is flowing.

As shown in Fig. 2, the light bulb 48 for each of the several gauging circuits may be mounted conveniently in a panel 52a of a casing 52 which encloses and shields the several electrode assemblies 32 and 32a. Preferably, each bulb 48 is located at substantially the same elevation as the electrode 36 with which it is associated.

Although not shown in the drawings, other indicating means, as for example, bells or buzzers, may be connected in place of or in parallel with the bulbs 48 so as to provide either, or both, visual and audible indication of a drop in plate circuit.

Adjustment and operation

The apparatus may be adjusted to indicate the presence of thin spots by placing a control carboy of the minimum permissible thickness and having a shape and dielectric constant identical with the carboys which are to be checked in the position shown in Figs. 1 and 2. Thereupon, the variable condenser of each circuit is adjusted to the critical point where further adjustment causes the plate current to drop below the intensity necessary to hold the relay 44 closed. When so adjusted the operation of the apparatus involves the following steps:

A carboy C is slid by hand from the receiving table 2a to the center of the work table 2.

Depression of the foot pedal 26 actuates the air cylinder motors 24 and 28, causing the spindle 29 to lift and the rollers 20, 20 to engage and hold the carboy against the driving rollers 12 in the position shown in the drawings.

Depression of the foot pedal 26 also closes the timer switch T'. If a thin spot is present opposite one of the detector elements 36, the plate current in the particular oscillator circuit which it controls remains below the predetermined minimum necessary for the relay coil 44 in that oscillator circuit to pull bar 50 against the associated pair of contacts 49a and 49b and current is not supplied to the motor 10 to start rotation of the carboy. The contact bar 50 remains in its spring biased position where it closes the associated pair of contacts 51a, 51b and lights the proper bulb 48 indicating which one of the detector elements 36 is adjacent the thin spot in the carboy.

However, if the carboy meets the minimum thickness requirement in the areas immediately adjacent the several elements 36, the capacitance of the several electrodes 36 will be sufficient to establish in all of the relay coils 44 the current necessary to draw the switch members 50 against the several pairs of contacts 49a and 49b and current will be supplied to the motor 10 to start rotation of the carboy. Assuming that no thin spots are detected by any one of the elements 36, the rotation will continue until the timer T breaks the circuit at the completion of a gauging cycle as, for example, one and one-quarter revolutions.

If, however, the capacitance of one of the detector elements 36 falls below the predetermined minimum, thus indicating the presence of a thin spot of less than the permitted minimum, a corresponding drop in the oscillator current is effected immediately; the relay coil 44 releases the movable contact bar 50 whereupon the current to motor 10 is interrupted and rotation of the carboy stopped. At the same time, the bar 50 closes the associated pair of contacts 51a, 51b and bulb 48 is lighted to indicate the particular detector element 36 opposite which the thin spot is located. The bulb 48 will remain lighted only until the gauging cycle period expires whereupon the timer T breaks any completed bulb circuits and further cuts the motor circuits. Should the timer switch T' be closed again without removing the carboy, the same bulb 48 would again be lighted for the ensuing cycle during which the motor circuit would remain open and the carboy would remain stationary.

While the oscillator circuit, as shown in Fig. 3, is permanently closed, it will be understood that a switch may be provided to open it when not in use and that, if desired, the timer T may be used so that the several oscillator circuits as well as the light and motor circuits are completed only for the period of the gauging cycle as determined by the setting of the timer T.

Following a gauging cycle, the pedal 26 is released whereupon fluid motor 24 moves the rollers 20 to the positions shown in phantom in Fig. 2; motor 28 retracts the spindle 29 and the carboy is lowered onto the table 2 for removal.

While the illustrated embodiment of the invention has been described in connection with the detection of thin spots in carboys, it will be appreciated that the device is applicable to the gauging of other articles formed of dielectric material, and that the device may be adapted to the detection of thick spots by interchanging the connections to terminals 49a and 51a and to terminals 49b and 51b.

The illustrated oscillator, while maintaining an approximately uniform normal anode current over a wide range of capacitance at the detector element 36, is extremely sensitive at a critical capacitance where an abrupt drop and return of anode current is effected within a very small capacitance range. Thus, when the critical capacitance corresponding to the desired critical dielectric thickness is established in this range, and preferably where a change of capacitance effects the greatest current change, the gauging device accurately rejects carboys or the like which vary as little as a thousandth of an inch in thickness from the selected maximum or minimum.

Modifications may be resorted to within the spirit and scope of the appended claim.

I claim:

In an apparatus for automatically detecting and rejecting jars, bottles and the like having excessive variations of wall thickness, means for rotating one of said articles, a plurality of inspection heads each having a single detector element spaced from the rotating article, means for maintaining said spacing constant, a high frequency oscillator circuit for each detector element, the current flowing in each of said circuits varying with a change in capacitance of the single electrode associated therewith, means operating to interrupt rotation of said article when the current in a circuit attains a predetermined value and a timer limiting the rotation of the article to a predetermined movement of revolution.

WILLIAM C. McDONALD.

REFERENCES CITED

The following references are of record in the file of this patent:

UNITED STATES PATENTS

| Number | Name | Date |
|---|---|---|
| 1,905,332 | Barbulesco | Apr. 25, 1933 |
| 2,018,673 | Howe | Oct. 29, 1935 |
| 2,150,922 | Hay | Mar. 21, 1939 |
| 2,222,221 | Burford | Nov. 19, 1940 |
| 2,228,294 | Wurzback | Jan. 14, 1941 |
| 2,241,190 | Fenning | May 6, 1941 |
| 2,285,152 | Firestone | June 2, 1942 |
| 2,297,346 | Crist | Sept. 29, 1942 |
| 2,488,811 | Eilenberger | Nov. 22, 1949 |